United States Patent [19]
Bauer et al.

[11] Patent Number: 5,456,493
[45] Date of Patent: Oct. 10, 1995

[54] CYLINDRICAL AIR BAG

[75] Inventors: John G. Bauer, Troy; Steven R. Fredin, Ortonville; Ronald W. Bonatz, West Bloomfield, all of Mich.

[73] Assignee: Morton International, Inc., Chicago, Ill.

[21] Appl. No.: 258,211

[22] Filed: Jun. 10, 1994

[51] Int. Cl.⁶ .................................................... B60R 21/16
[52] U.S. Cl. ........................................ 280/743.1; 280/731
[58] Field of Search ......................... 280/743 R, 728 R, 280/731, 730 R, 732, 743 A, 730 A, 729, 743.1, 728.1, 730.1, 743.2, 730.2

[56] References Cited

U.S. PATENT DOCUMENTS

| | | | |
|---|---|---|---|
| 3,580,603 | 5/1971 | Chute et al. | 280/743 R |
| 3,582,107 | 6/1971 | Goetz et al. | 280/730 R |
| 5,071,161 | 12/1991 | Mahon et al. | 280/743 R |
| 5,205,583 | 4/1993 | Henseler et al. | 280/743 R |

FOREIGN PATENT DOCUMENTS

| | | | |
|---|---|---|---|
| 4078746 | 3/1992 | Japan | 280/743 R |
| 4118334 | 4/1992 | Japan | 280/743 R |

*Primary Examiner*—Kenneth R. Rice
*Assistant Examiner*—Peter C. English
*Attorney, Agent, or Firm*—Philip C. Peterson; Gerald K. White

[57] ABSTRACT

An air bag formed of thin flexible sheet material is mounted in a housing within a motor vehicle in a deflated condition and is rapidly inflatable for protecting an occupant in the passenger compartment of the vehicle. The air bag has an elongated, generally cylindrical shape when deployed to inflate for expanding directly and more rapidly from the housing into protective cushioning contact with the occupant thus reducing the chances that the occupant will be subjected to excessive movement or velocity relative to the interior of the vehicle and further reducing the possibility that the occupant will be subjected to unwanted contact with closely adjacent surfaces in a relatively small passenger compartment of the vehicle. The novel air bag is formed from three pieces including a pair of generally circular inner and outer end walls joined together with a cylindrically-shaped side wall.

7 Claims, 4 Drawing Sheets

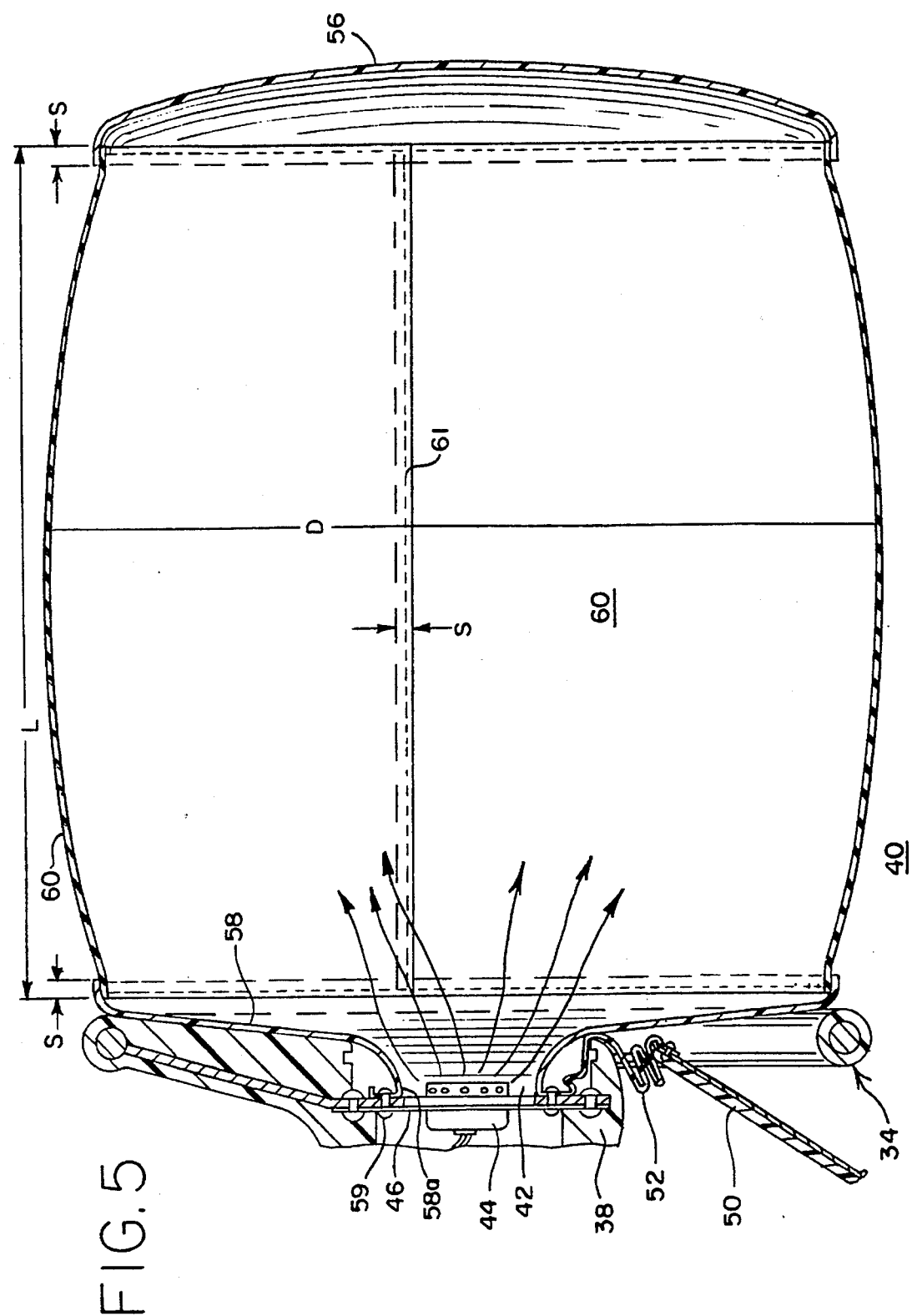

FIG. 6 A
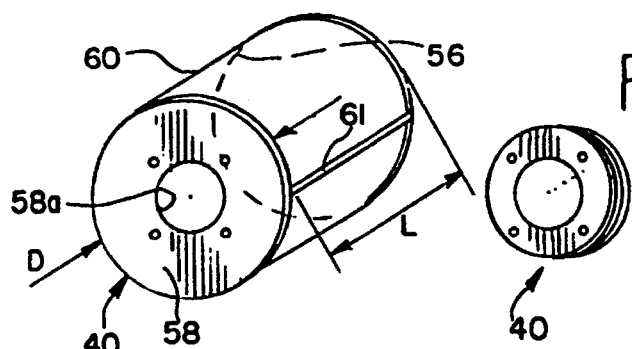
FIG. 6 B
FIG. 7 A  FIG. 7 B  FIG. 7 C
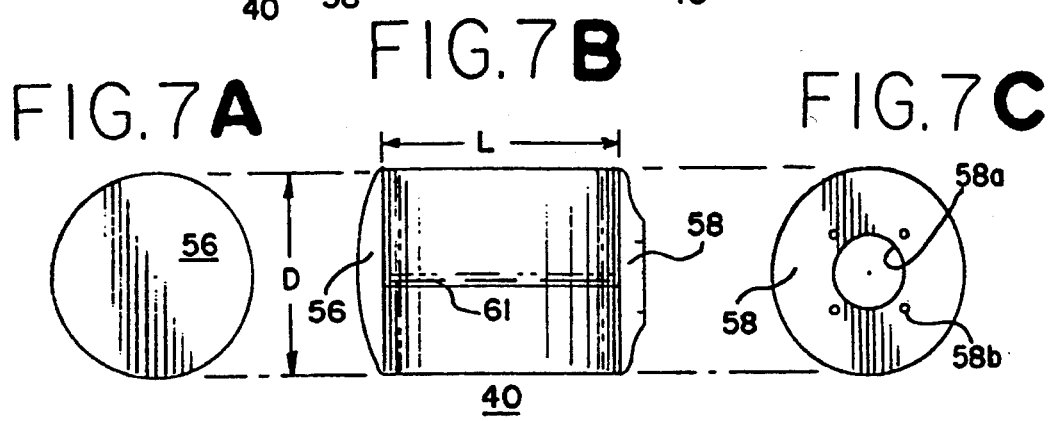
FIG. 8 B
FIG. 8 A  FIG. 8 C
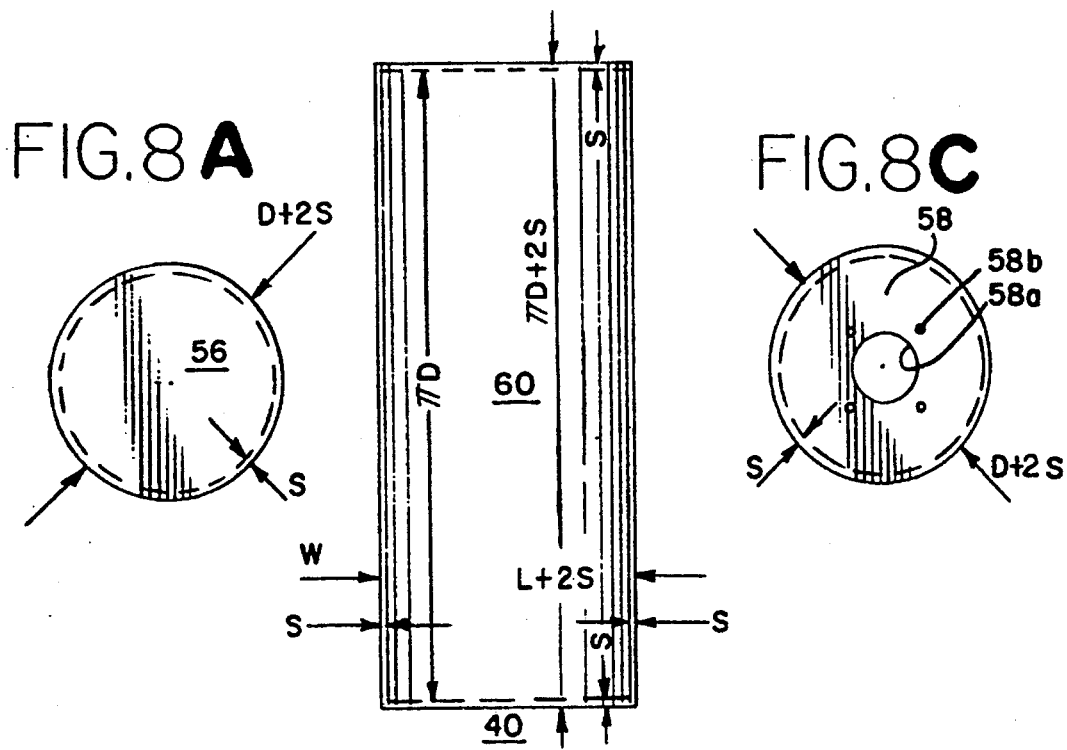

CYLINDRICAL AIR BAG

BACKGROUND OF THE INVENTION

1. Field of the Invention

The present invention relates to rapidly inflatable gas filled protective cushions known as air bags and used in motor vehicles for cushioning an occupant against impact or excessive movement in the event of rapid acceleration or deceleration of the vehicle.

More particularly, the present invention is especially adapted for use in relatively small compact or sub-compact size motor vehicles wherein a windshield surround, or header, is positioned relatively close to a driver or other occupant seated on a front seat in a passenger compartment of the vehicle. In such vehicles it is desirable to minimize the movement of a person toward or relative to a windshield surround or header, in order to minimize the chances of head, neck and other bodily injuries.

2. Background of the Prior Art

When conventional driver side air bags and passenger side air bags are deployed and inflated, the bags extend outwardly toward the occupant only a limited amount and tend to spread out laterally. In small cars and trucks having minimal clearance in the passenger compartments, it is desirable that an inflating air bag reach and contact the occupant much sooner than in a larger vehicle, thereby reducing the possibility of head and neck injury and unwanted contact with a windshield, windshield surround or headliner of the vehicle. Conventional air bags on a driver's side usually are formed from two pieces of sheet material having a circular shape joined together around the periphery. These air bags inflate to form a relatively flat cushion and may allow considerable movement of the driver toward the steering wheel before a cushioning effect is realized. Similarly, air bag cushions commonly utilized on the passenger side of a vehicle form a generally rectangular-shaped, somewhat flattened cushion and are constructed from two sheets of flexible sheet material of generally rectangular shape joined around the periphery. Oftentimes both driver and passenger side air bags may permit substantial movement of a passenger before a protective cushioning effect is achieved after air bag deployment.

OBJECTS OF THE INVENTION

It is an object of the present invention to provide a new and improved air bag for motor vehicles which expands farther outwardly when deployed toward a vehicle occupant than prior art air bags.

Another object of the invention is to provide a new and improved air bag of generally cylindrical shape when deployed for effecting protective cushioning action for a vehicle occupant faster than prior art air bag cushions.

Another object of the present invention is to provide a new and improved air bag which is shaped to expand more rapidly directly toward a vehicle occupant, thereby reducing the velocity of the occupant relative to the interior of the vehicle during air bag deployment.

Yet another object of the present invention is to provide a new and improved generally cylindrical air bag which is narrower in diameter than prior art air bags so that upon inflation with the same given volume of gas from an inflator, an outer, occupant engaging cushioning surface of the bag is in cushioning position more rapidly than with prior air bag systems.

Still another object of the present invention is to provide a new and improved air bag of the character described which is especially designed for small size vehicles to provide occupant restraining cushioning action much sooner and more rapidly than heretofore thought possible.

BRIEF SUMMARY OF THE PRESENT INVENTION

The foregoing and other objects and advantages of the present invention are accomplished in a new and improved air bag formed of thin flexible sheet material and mounted within a housing contained in a motor vehicle in a passenger compartment thereof. The housing contains the air bag in a deflated, compact, condition and an inflator is provided to generate gas for rapidly inflating the air bag upon deployment to provide protective cushioning for a vehicle occupant in a very short time. The new and improved air bag is designed to have an elongated, generally cylindrical shape when deployed to inflate resulting in a more rapid expansion from the housing in a direction facing directly toward a vehicle occupant and with a minimal amount of lateral expansion of the air bag. The novel air bag employs inner and outer end walls of circular shape having a diameter substantially less than prior art type air bags and includes a generally cylindrical side wall or panel joined at opposite ends to the periphery of the inner and outer end walls. Upon air bag inflation, the side wall expands outwardly directly toward the vehicle occupant with minimal lateral expansion and the outer end wall becomes spaced a greater distance away from the inflator in the housing than heretofore thought possible with prior art air bags. The unique shape of the air bag provides an extremely fast and effective cushioning action for an occupant and minimizes the velocity of an occupant relative to the interior of the vehicle during air bag deployment.

BRIEF DESCRIPTION OF THE DRAWINGS

For a better understanding of the present invention, reference should be had to the following detailed description taken in conjunction with the drawings, in which:

FIG. 5 is an enlarged, cross-sectional view similar to FIG. 2 illustrating the new and improved cylindrical air bag in a fully inflated, condition after deployment;

FIGS. 6A and 6B are perspective views in somewhat animated form illustrating the contrasting shape and size of the air bag of the present invention in a fully inflated, deployed condition on the left (FIG. 6A) and in a deflated, storage condition on the right (FIG. 6B);

FIG. 7A, 7B and 7C include elevational views of the air bag in an inflated condition showing the shape of an outer end wall on the left (FIG. 7A), a cylindrical side wall in the center (FIG. 7B) and an inner end wall on the right (FIG. 7C); and FIGS. 8A, 8B and 8C are plan views illustrating patterns to be cut from flat flexible sheet material for three wall forming wall components used in making up an air bag in accordance with the present invention.

DETAILED DESCRIPTION OF A PREFERRED EMBODIMENT OF THE INVENTION

Figure 1:
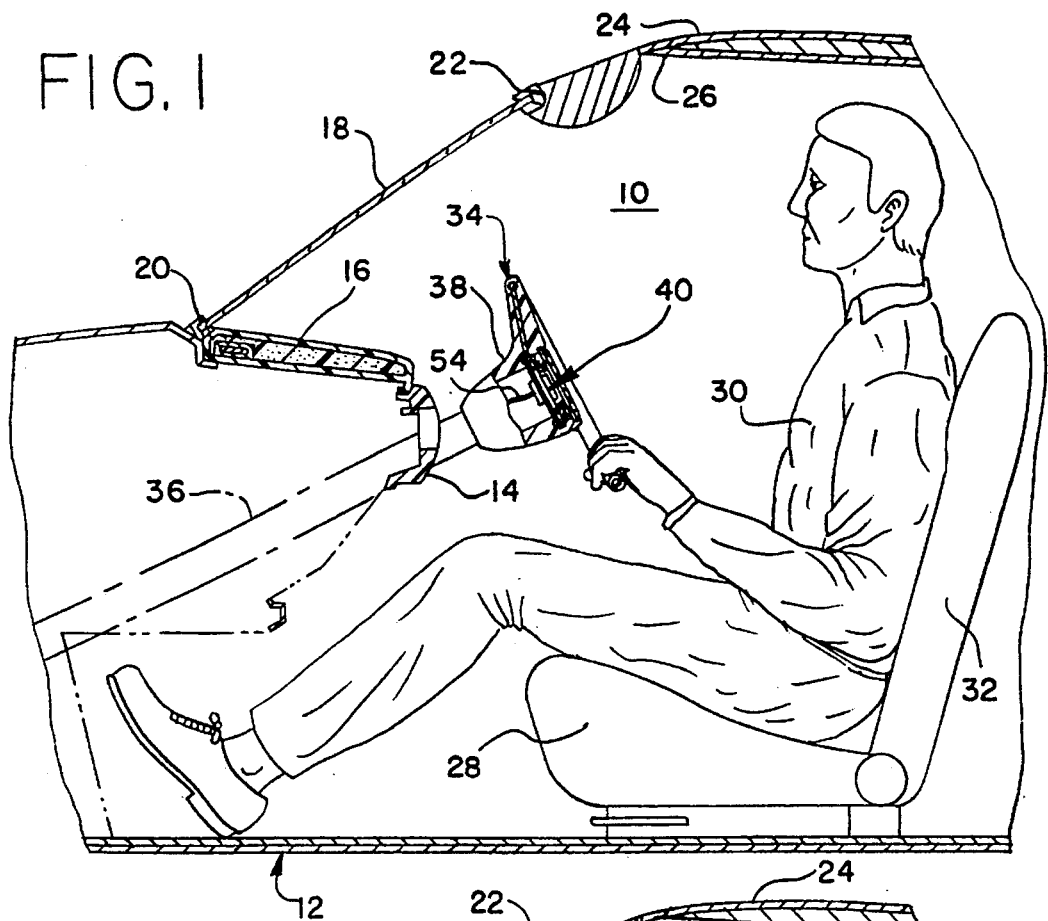
FIG. 1 is a longitudinal cross-sectional view of a passenger compartment of a motor vehicle containing a new and improved air bag constructed in accordance with the features of the present invention and shown in a deflated or non-deployed, compact condition contained in a housing on the vehicle steering wheel.
Figure 2:
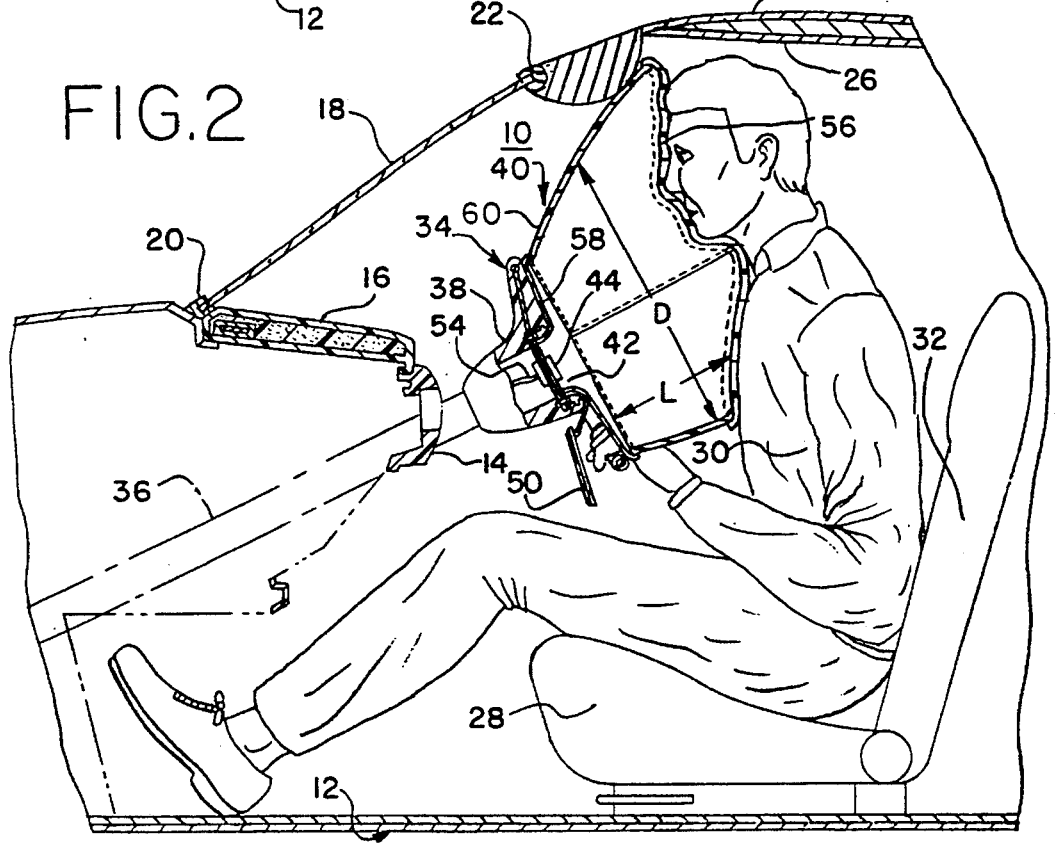
FIG. 2 is a similar longitudinal cross-sectional view illustrating the air bag after deployment to rapidly inflate and expand directly toward a driver of the vehicle.
Figure 3:
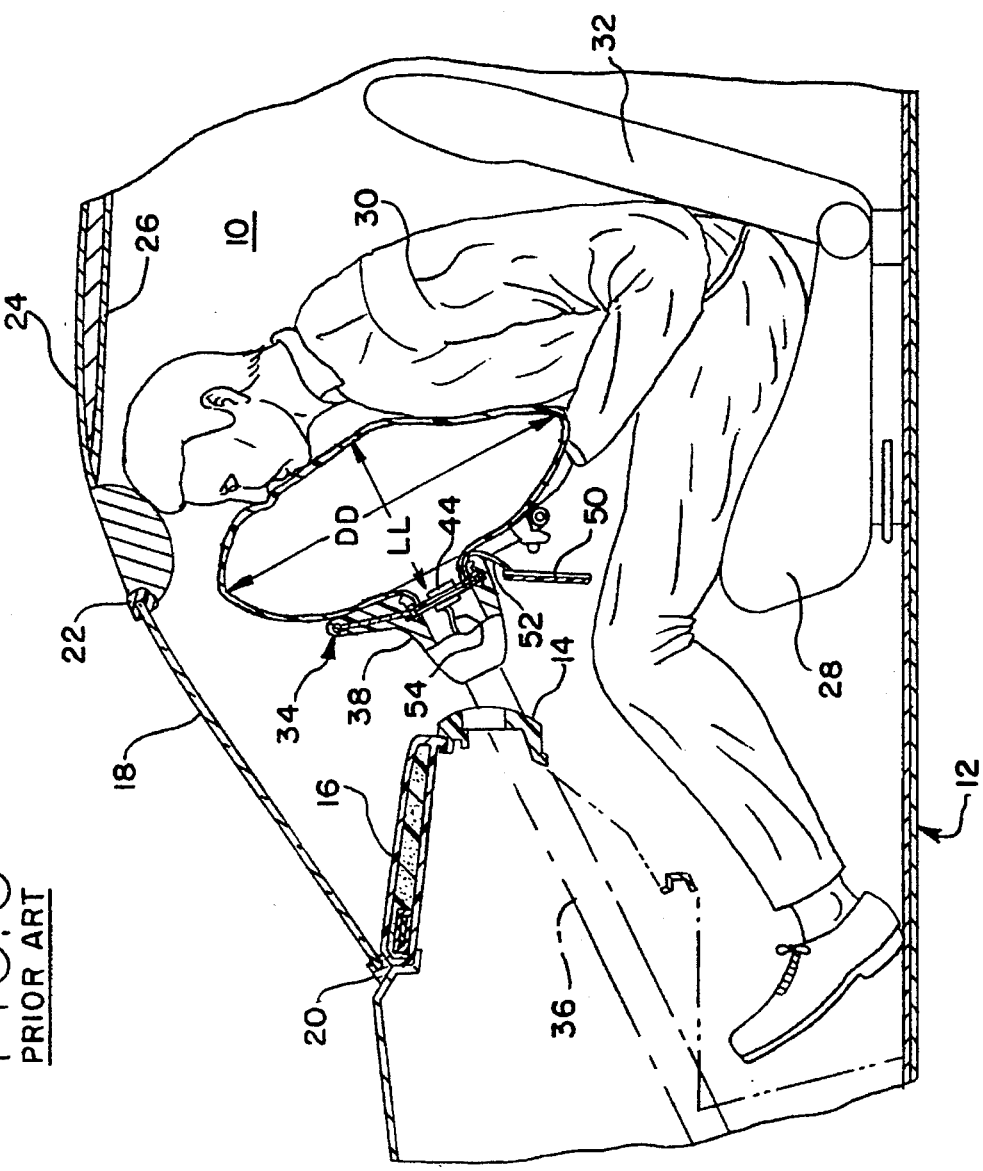
FIG. 3 is a longitudinal cross-sectional view similar to FIGS. 1 and 2, illustrating a typical prior art air bag in a deployed condition engaging a driver of the vehicle.

Referring now more particularly to the drawings, in FIGS. 1, 2 and 3 is illustrated a longitudinal cross-sectional view of the forward portion of a passenger compartment 10 of a typical small size, compact or sub-compact type motor vehicle 12. A forward portion of the passenger compartment 10 includes a dashboard or panel 14 joined along an upper edge to a deck 16 having a forward extending along and adjacent to a lower edge of a windshield 18. The windshield 18 slopes rearwardly and upwardly from a lower surround 20 or frame member to an upper surround 22. A roof panel 24 extends rearwardly of the upper windshield surround 22 and a headliner 26 covers the underside of the roof panel and extends rearwardly from the upper surround or header 22.

One or more seats 28 are mounted in the passenger compartment 10 for supporting a driver 30 in a sitting or driving position as shown in FIG. 1 and the back of the driver is supported by an upstanding seat back 32. The vehicle 12 is steered by means of a steering wheel 34 mounted at the upper end of an elongated steering column 36 sloping forwardly and downwardly from a central hollow hub portion 38 of the steering wheel.

Figure 4:
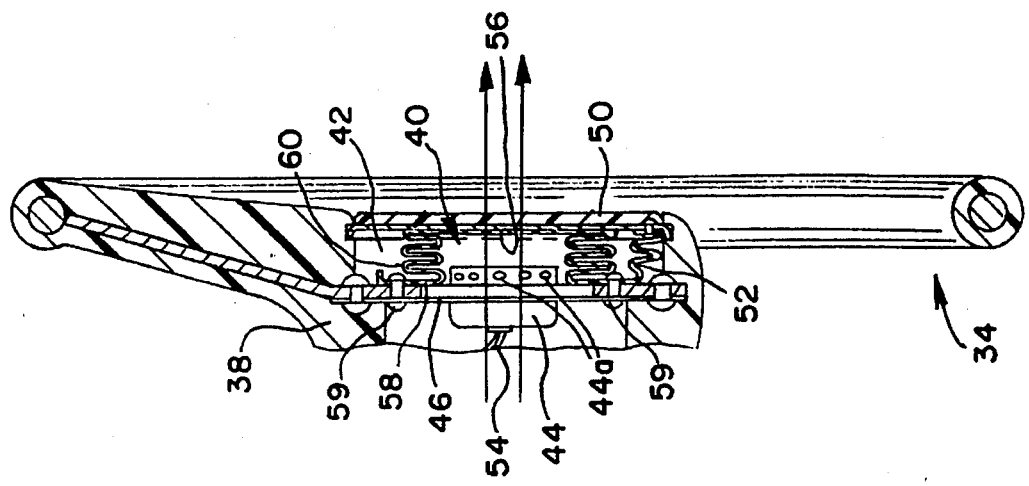
FIG. 4 is an enlarged, cross-sectional view taken on a diametrical plane through a steering wheel of the vehicle and illustrating the air bag in accordance with the invention in a deflated, compact condition contained in a housing on the steering wheel.

In accordance with the present invention, a new and improved inflatable air bag safety cushion 40 is contained in a compact, deflated condition (FIGS. 1 and 4) in the hollow hub central portion 38 of the steering wheel 34. An air bag inflator 44 containing a gas generating material is also mounted in the hub portion 38 and the air bag 40 rapidly inflates as shown in FIGS. 2 and 5 when the inflator is activated for providing protective cushioning engagement with a forward side on the head and chest of the driver 30. Normally, the air bag 40 (as shown in FIG. 6B) is in a compact deflated condition mounted within the hollow hub portion 38 of the steering wheel 34 as shown in FIGS. 1 and 4. The hollow hub portion 38 provides a convenient housing or chamber 42 for containing the deflated air bag 40 and an electrically activated gas generating inflator 44 which is mounted on an annular base plate 46 in the steering wheel hub. During normal vehicle operation, the central housing or chamber 42 is closed by means of a cover 50 and the cover is pushed away or opened up as shown in FIG. 5 by pressure from the air bag 40 as the air bag rapidly inflates. The cover 50 is normally secured in place in fixed position relation to the base plate 46 until the air bag is deployed and a tether cord 52 may be provided for positively retaining the opened cover in close proximity to the steering wheel hub 38 during and after air bag deployment.

The inflator 44 is adapted to be activated by an electrical signal received through wires 54 running down the steering column and once activated the gas generating material rapidly produces a volume of expanding gas flowing out through a plurality of diffuser ports 44a to cause the air bag 40 to rapidly inflate, push away or open up the cover 50 and rapidly expand outwardly from the steering wheel 34 along an axis generally aligned with the steering column 36 and facing directly towards the head and shoulders of the driver 30. Typically the inflator 44 includes a ring of diffuser ports 44a for permitting the gas generated to flow outwardly around the periphery of the inflator to rapidly fill and inflate the air bag 40.

Referring now more particularly to FIGS. 2 and 5 through 8C, the air bag 40 is formed of thin flexible sheet material and is designed to have a generally cylindrical shape when fully inflated (FIGS. 2, 5, 6A and 7B) upon air bag deployment. The cylindrical shape of the air bag 40 insures that the inflation process is concentrated and directed to proceed rapidly outward from the steering wheel 34 directly toward the driver 30. Expansion of the air bag 40 during inflation is limited in a lateral direction relative to the steering column unlike the prior art air bag shown in FIG. 3. Lateral expansion is minimized because the diameter D of the inflated air bag 40 is constructed to be about the same diameter as the steering wheel 34.

The air bag 40 in accordance with the present invention rapidly inflates upon deployment and in a very short time interval, contacts and protectively cushions the head and shoulders of the driver 30. Protective cushioning is attained much sooner with the cylindrical air bag 40 than with prior art air bags, many of which tend to expand a greater amount in a laterally outward direction to the detriment of more concentrated expansion directly toward the driver. For the same given volume of gas produced by the inflator 44, the cylindrical air bag 40 provides protective cushioning for the driver 30 much earlier and thereby tends to better limit unwanted movement or deflection of the driver 30 to a greater degree than a prior art air bag as in FIG. 3.

In small cars and trucks with minimum clearance as shown in FIG. 3, a prior art air bag may permit a driver's head to strike the windshield, roof or windshield surround of the vehicle. It should also be noted as illustrated in FIG. 3, because of later or slower cushioning engagement using a relatively flat prior art air bag, the body of a driver 30 may move farther away from the back rest 32 of the seat 28 and thus the velocity of the driver 30 relative to the passenger compartment 10 may be quite a bit greater before cushioning engagement than with the air bag 40 which provides for much faster cushioning engagement. The rapid expansion during deployment of the cylindrical air bag 40 is restrained or contained in a lateral direction and instead is focused and concentrated in a direction facing directly toward the vehicle driver 30.

FIG. 6A, 6B and 6C comparatively illustrate in perspective views, the new and improved cylindrical air bag 40 in a fully inflated, deployed condition on the left and on the right the air bag is illustrated in a deflated, compact condition as when contained or stored in the steering wheel hub 38. FIG. 7A illustrates an outer end wall 56 of the inflated air bag 40 which is generally circular in shape and adapted to make protective cushioning contact with the driver 30 upon air bag deployment. As shown in the FIG. 7C, the air bag 40 includes a matching diameter annular inner end wall 58 having a central opening 58a for accommodating the inflator 44 As best illustrated in FIGS. 5, 7C and 8C, the annular inner end wall 58 of the air bag 40 is formed with a plurality of small openings 58b arranged in a ring spaced around the central opening 58a to accommodate rivets 59 or other fasteners used to attach the inner end of the air bag 40 to the mounting plate 46 around the inflator 44. The circular outer end wall 56 and the circular inner end wall 58 are joined with a cylindrical, body side wall section 60 to form the completed generally cylindrically-shaped air bag as shown in FIGS. 5–7C.

Referring now to FIG. 8B, the cylindrical side wall 60 is cut from a flat sheet of thin flexible material in a rectangular pattern having a dimension L+2S along the steering wheel axis and a dimension πD+2S transverse thereto. D represents the diameter of the end walls 56 and 58 of the air bag 40, and these walls are also cut from a flat piece of flexible sheet material in circular patterns having an overall diameter of D+2S as shown in FIGS. 8A and 8C. S represents a seam width for joining the end walls 56 and 58 to the side wall 60 and the width of a seam 61 for joining the opposite ends of the side wall pattern as shown in FIG. 8B to form the pattern into a cylindrically-shaped assembly or unit.

Preferably the air bag 40 is dimensioned with a diameter D of the end walls 56 and 58 which is approximately equal to or slightly larger than the outer diameter of the steering wheel 34 but considerably smaller than the diameter DD (FIG. 3) of a typical flatter prior art air bag. In addition, it is clearly seen in FIG. 3 that the amount of air bag inflation along the steering axis represented by the letters LL is considerably less than the dimension L of the new cylindrical air bag 40. As shown in FIGS. 5 through 7C, when fully inflated the air bag 40 will have a length L along the axis of the steering column approximately equal to the width of the pattern of the side wall 60 as shown in FIG. 8B. The opposite end walls 56 and 58 and the side wall 60 will tend to expand outwardly or bulge when inflated so that the overall width and length dimensions of the air bag 40 are somewhat longer than the individual pattern pieces during an actual inflation as shown best in FIG. 5.

The air bag 40 is formed from three separate pattern pieces rather than the customary two piece prior art air bag as shown in FIG. 3. The designed cylindrical shape causes the air bag 40 to elongate in a direction away from the steering column along the axis thereof directly toward the driver 30 in a very rapid fashion providing cushioning protection much quicker and faster to limit the amount of movement and velocity of the driver relative to the passenger compartment 10.

It has been found that an air bag 40 having an end wall diameter D about the same as or slightly larger than the diameter of the steering wheel 34 and a length L considerably greater than the inflated length LL of a relatively flat prior art air bag (FIG. 3) is particularly effective for providing rapid protective cushioning engagement upon air bag deployment even though the same volume of gas is generated in each case. It can be expected that the number and severity of auto injuries may be greatly reduced in small cars equipped with a cylindrical air bag 40 in comparison to prior art type two piece bags as shown in FIG. 3.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An airbag formed of thin flexible sheet material mounted in a housing in a motor vehicle in a deflated condition and rapidly inflatable for protecting an occupant in a passenger compartment of the vehicle;

said airbag having an elongated, generally cylindrical shape of circular transverse cross-section when deployed to inflate for expanding more rapidly from said housing in a direction extending from said housing directly toward the occupant without substantial lateral expansion from said direction until engaging the occupant for reducing the chance that the occupant will move into contact with an adjacent surface in the passenger compartment;

said airbag having an annular, generally circular shaped inner end wall adjacent the housing with a central circular opening for receiving an air bag inflator, an outer end wall having a circular shape matching said inner end wall adapted for cushioning engagement with the occupant, and a cylindrical-shaped side wall interconnected between said end walls for restricting expansion laterally of said direction, said side wall having an inflated length (L) as measured between said end walls before said outer end wall engages the occupant that is considerably greater than the diameter (D) of said end walls providing rapid protective cushioning for the occupant.

2. The airbag of claim 1, wherein:

said end walls have substantially circular outer edges joined with respective opposite ends of said side wall.

3. The airbag of claim 1, wherein:

said side wall is formed with a side seam extending between said end walls.

4. The airbag of claim 1, wherein:

said inner end wall is secured to the housing outwardly around the inflator.

5. The airbag of claim 1, wherein:

said inflated length of said inflated airbag is dimensioned so that movement of the occupant in a direction toward the housing during airbag deployment is substantially restrained.

6. The airbag of claim 1, wherein:

said outer end wall is positioned to move from the housing in a direction toward the chest and/or head of the occupant upon inflating deployment of said airbag.

7. The airbag of claim 6, wherein:

said airbag is contained in the housing when deflated and the housing is centrally mounted in coaxial alignment on a steering wheel of the vehicle.

\* \* \* \* \*